US011926917B2

(12) United States Patent
Kato et al.

(10) Patent No.: US 11,926,917 B2
(45) Date of Patent: Mar. 12, 2024

(54) COMPOSITE PLATING MATERIAL AND METHOD FOR PRODUCING THE SAME

(71) Applicant: DOWA METALTECH CO., LTD., Tokyo (JP)

(72) Inventors: Yukiya Kato, Tokyo (JP); Hirotaka Kotani, Tokyo (JP); Tatsuhiro Doi, Tokyo (JP); Takao Tomiya, Tokyo (JP); Hiroto Narieda, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 0 days.

(21) Appl. No.: 17/790,545

(22) PCT Filed: Jun. 10, 2020

(86) PCT No.: PCT/JP2020/022913

§ 371 (c)(1),
(2) Date: Jul. 1, 2022

(87) PCT Pub. No.: WO2021/140688

PCT Pub. Date: Jul. 15, 2021

(65) Prior Publication Data

US 2023/0046780 A1 Feb. 16, 2023

(30) Foreign Application Priority Data

Jan. 6, 2020 (JP) ................................ 2020-000254

(51) Int. Cl.

| | |
|---|---|
| ***C25D 15/00*** | (2006.01) |
| ***C25D 3/46*** | (2006.01) |
| ***C25D 5/12*** | (2006.01) |
| ***C25D 21/10*** | (2006.01) |
| ***H01B 1/02*** | (2006.01) |

(52) U.S. Cl.

CPC .............. *C25D 15/00* (2013.01); *C25D 3/46* (2013.01); *C25D 5/12* (2013.01); *C25D 21/10* (2013.01); *H01B 1/02* (2013.01)

(58) Field of Classification Search

None

See application file for complete search history.

(56) References Cited

U.S. PATENT DOCUMENTS

| | | | | | |
|---|---|---|---|---|---|
| 2004/0202884 | A1* | 10/2004 | Buresch | B22F 7/02 | 428/553 |
| 2006/0099443 | A1* | 5/2006 | Nakashima | F16C 33/14 | 428/673 |
| 2007/0007497 | A1 | 1/2007 | Miyazawa et al. | | |
| 2011/0256356 | A1* | 10/2011 | Tomantschger | C25D 17/008 | 977/734 |
| 2016/0032478 | A1* | 2/2016 | Saito | C25D 5/611 | 205/109 |
| 2016/0343643 | A1 | 11/2016 | Hishiki et al. | | |

FOREIGN PATENT DOCUMENTS

| | | | |
|---|---|---|---|
| JP | 2006-169609 | A | 6/2006 |
| JP | 2007-16250 | A | 1/2007 |
| JP | 2007-254876 | A | 10/2007 |
| JP | 2007254876 | A * | 10/2007 |
| JP | 2012-119308 | A | 6/2012 |
| JP | 2013-189680 | A | 9/2013 |
| JP | 2013189680 | A * | 9/2013 |
| JP | 2016-219524 | A | 12/2016 |

OTHER PUBLICATIONS

International Search Report and Written Opinion of the International Searching Authority issued in International Patent Application No. PCT/JP2020/022913, dated Aug. 25, 2020, along with an English translation thereof.

International Preliminary Report on Patentability in International Patent Application No. PCT/JP2020/022913, dated Aug. 25, 2020, along with an English translation thereof.

* cited by examiner

*Primary Examiner* — Seth Dumbris

(74) *Attorney, Agent, or Firm* — GREENBLUM & BERNSTEIN, P.L.C.

(57) ABSTRACT

There is provided a composite plating material and a related technique thereof, the composite plating material including: a base material, and a composite plating layer on the base material, the composite plating layer comprising a composite material containing carbon particles and Sb in an Ag layer, with a carbon content of 6.0 mass % or more and a Sb content of 0.5 mass % or more.

18 Claims, No Drawings

COMPOSITE PLATING MATERIAL AND METHOD FOR PRODUCING THE SAME

TECHNICAL FIELD

The present disclosure relates to a composite plating material and a method for producing the same.

DESCRIPTION OF RELATED ART

Conventionally, in order to prevent oxidation of conductor materials such as copper and copper alloys due to heating during a sliding process, silver-plated materials with silver plating on the conductor materials are used as the materials for sliding contact parts such as switches and connectors used in automobiles, etc.

However, silver plating is soft and easily worn, and generally has a high friction coefficient, thus involving a problem that it is easily peeled off by sliding. In order to solve such a problem, there is a method of forming a silver alloy plating film or a silver composite plating film in which graphite particles are dispersed in a silver matrix, on a conductor material by electroplating to improve wear resistance.

Patent Document 1 discloses in paragraph [0026] as follows: in a silver plating solution containing 120 g/L of potassium silver cyanide, 120 g/L of cyanide potassium, 30 g/L of sodium potassium tartrate tetrahydrate, and 7 g/L of antimonate tartrate (Sb) potassium, electroplating (second silver plating) is performed until a total thickness of a silver plating layer (of a first silver plating layer and a second silver plating layer) reaches 3 μm, while stirring with a stirrer at 400 rpm, with a material to be plated as a cathode and a silver electrode plate as an anode, with a current density set at 5 $A/dm^2$ and a liquid temperature set at 20° C.

Patent Document 2 discloses in paragraph [0033] as follows: 80 g/L of oxidized carbon particles are added to a silver cyanide plating solution comprising 120 g/L of potassium silver cyanide and 100 g/L of potassium cyanide, and dispersed and suspended, then, potassium cyanoselenate (KSeCN) is added, to prepare a composite plating solution of silver and carbon particles.

Also, Patent Document 2 discloses as follows: using this composite plating solution, electroplating is performed with a liquid temperature set at 25° C. and a current density set at 1 $A/dm^2$, respectively, to prepare a composite plating material in which a composite plating film of silver and carbon particles having a film thickness of 5 μm is produced on a copper plate having a thickness of 0.3 mm as a material.

Also, Patent Document 2 discloses as follows: in order to improve an adhesion of the plating film, Ag strike plating is performed as an underplating, with a liquid temperature set at 25° C. and a current density set at 3 $A/dm^2$, in an Ag strike plating bath having a composition of 3 g/L of potassium silver cyanide and 100 g/L of potassium cyanide.

PRIOR ART DOCUMENT

Patent Document

[Patent Document 1] Japanese Unexamined Patent Publication No. 2013-189680

[Patent Document 2] Japanese Unexamined Patent Publication No. 2007-16250

SUMMARY OF THE DISCLOSURE

Problem to be Solved by the Disclosure

According to an investigation by the present inventors, it has been found that there is room for improvement in a wear resistance of a plating material obtained by the methods described in Patent Documents 1 and 2.

An object of the present disclosure is to provide a composite plating material with high wear resistance, a method for producing the same, and a related technique thereof.

Means for Solving the Problem

According to an aspect of the present disclosure, there is provided a composite plating material, including:

a base material, and a composite plating layer on the base material, the composite plating layer comprising a composite material containing carbon particles and Sb in an Ag layer, with a carbon content of 6.0 mass % or more and a Sb content of 0.5 mass % or more.

According to a second aspect of the present disclosure, there is provided the composite plating material of the first aspect, wherein a percentage occupied by the carbon particles on the surface of the composite plating layer is 15 to 80% in terms of an area ratio.

According to a third aspect of the present disclosure, there is provided the composite plating material of the first or second aspect, wherein surface Vickers hardness HV of the composite plating material is 150 or more.

According to a fourth aspect of the present disclosure, there is provided the composite plating material of any one of the first to third aspects, wherein arithmetic mean surface roughness Ra of the composite plating layer is 0.3 μm or more.

According to a fifth aspect of the present disclosure, there is provided the composite plating material of any one of the first to fourth aspects, wherein a crystallite size of the composite plating layer is 40 nm or less.

According to a sixth aspect of the present disclosure, there is provided the composite plating material of any one of the first to fifth aspects, wherein a carbon content in the composite plating layer is 30 mass % or less, and a Sb content is 5 mass % or less.

According to a seventh aspect of the present disclosure, there is provided the composite plating material of any one of the first to sixth aspects, wherein the base material is copper or a copper alloy.

According to an eighth aspect of the present disclosure, there is provided the composite plating material of any one of the first to seventh aspects, wherein an underplating layer is provided between the base material and the composite plating layer.

According to a nineth aspect of the present disclosure, there is provided the composite plating material of any one of the first to eighth aspects, wherein the underplating layer includes at least one selected from a Ni plating layer and a Cu plating layer.

According to a tenth aspect of the present disclosure, there is provided a method for producing a composite plating material, including:

performing electroplating using a composite plating solution in which carbon particles are added to an Ag plating solution containing Sb, thereby forming a composite plating layer on a base material, the composite plating layer comprising a composite material containing carbon particles and Sb in an Ag layer, with a carbon content of 6.0 mass % or more and a Sb content of 0.5 mass % or more.

According to an eleventh aspect of the present disclosure, there is provided the method for producing a composite plating material of the tenth aspect, wherein a percentage occupied by the carbon particles on a surface of the composite plating layer is 15 to 80% in terms of an area ratio.

According to a twelfth aspect of the present disclosure, there is provided the method for producing a composite plating material of the tenth or eleventh aspect, wherein a stirring speed for the composite plating solution when forming the composite plating layer is 400 rpm or less.

According to a thirteenth aspect of the present disclosure, there is provided the method for producing a composite plating material of any one of the tenth to twelfth aspects, wherein a current density of the electroplating is 4 $A/dm^2$ or more.

According to a fourteenth aspect of the present disclosure, there is provided the method for producing a composite plating material of any one of the tenth to thirteenth aspects, wherein the carbon particles are carbon particles that have been subjected to an oxidation treatment.

According to a fifteenth aspect of the present disclosure, there is provided the method for producing a composite plating material of any one of the tenth to fourteenth aspects, wherein an underplating layer is formed on the base material before forming the composite plating layer.

According to a sixteenth aspect of the present disclosure, there is provided the method for producing a composite plating material of the fifteenth aspect, wherein the underplating layer includes at least one selected from a Ni plating layer and a Cu plating layer.

Advantage of the Invention

According to the present invention, there is provided a composite plating material having high wear resistance, a method for producing the same, and a related technique thereof.

DETAILED DESCRIPTION OF THE INVENTION

The present embodiment will be described hereafter. In the present specification, " . . . to . . . " refers to a predetermined numerical value or more and a predetermined numerical value or less.

(Composite Plating Material)

In a composite plating material according to the present embodiment, a composite plating layer is formed on a base material, the composite plating layer comprising a composite material containing carbon particles and Sb in an Ag layer. In the composite plating layer, a carbon content is 6.0 mass % or more, and a Sb content is 0.5 mass % or more.

With this configuration, the composite plating material of the present invention can dramatically improve wear resistance, compared to a composite plating material in which a composite plating layer is provided on a base material, the composite plating layer comprising a composite material containing carbon particles (not containing Sb) in an Ag layer, and a composite plating material in which a composite plating layer is provided on a base material, the composite plating layer comprising Sb (not containing carbon particles) in an Ag layer (for details, see the item of examples described later).

The carbon content in the composite plating layer is 6.0 mass % or more (preferably 7 mass % or more, further preferably 8 mass % or more). When it is less than the above content, the improvement of wear resistance characteristics is insufficient. Further, since no significant improvement in wear resistance is observed even when a large amount of carbon particles is contained, the carbon content may be 30 mass % or less.

The content of Sb in the composite plating layer is 0.5 mass % or more (preferably 1.0 mass % or more, more preferably 1.5 mass % or more, and 5 mass % or 3 mass % as an example of an upper limit). Thereby the hardness of the composite plating layer (material) is improved.

The content of carbon and Sb in the composite plating layer is obtained by measuring a surface of the composite plating layer by energy dispersive X-ray analysis using an energy dispersive X-ray analyzer attached to a scanning electron microscope.

The composite plating layer comprising a composite plating material provided on a base material has a large carbon content and a large amount of carbon particles on the surface, and is excellent in wear resistance. The carbon particles on the surface can be expressed as "a percentage occupied by the carbon particles on the surface of the composite plating layer is 15 to 80% (more preferably 18% or more and less than 60%) in terms of an area ratio". The definition (measurement and calculation method) of the area ratio, which is the percentage occupied by the carbon particles on the surface, will be described in the item of examples described later.

Vickers hardness HV of the composite plating material is preferably 150 or more. The definition (measurement method) of the Vickers hardness HV is described in the item of examples described later.

An arithmetic mean surface roughness Ra of the composite plating layer is preferably 0.3 μm or more, in consideration of a degree to which the carbon particles are likely to be entangled in the composite plating layer. The arithmetic mean surface roughness Ra is preferably 10 μm or less, more preferably 8 μm or less. The definition (measurement method) of the arithmetic mean surface roughness Ra is described in the item of examples described later.

A crystallite size of the composite plating layer is preferably 40 nm or less. The definition (measurement method) of the crystallite size will be described in the item of examples described later.

An underplating layer may be formed between the base material and the composite plating layer. Further, the underplating layer preferably comprises at least one selected from a Ni plating layer and a Cu plating layer.

The base material is not limited, but the base material is preferably copper or a copper alloy.

It is preferable that the ratio of the mass % of Ag, the mass % of Sb, and the mass % of carbon in the composite plating layer is 93.5:0.5:6 to 65:5:30, because not only the wear resistance but also other characteristics can be improved. That is, the mass % of Ag is preferably set between 65 and 93.5 mass %, and the mass % of Sb is preferably set between 0.5 and 5 mass %, and the mass % of carbon is preferably set between 6 and 30 mass %, in the composite plating layer.

Further, the thickness of the composite plating layer is preferably 0.5 to 25 μm, more preferably 1 to 20 μm. Within the above range, sufficient wear resistance can be ensured and production efficiency is also good. The definition (measurement method) of the thickness of the composite plating layer is described in the item of examples described later.

(Method for Producing a Composite Plating Material)

As an embodiment of the method for producing a composite plating material of the present invention, there is provided a method for producing a composite plating layer, including: performing electroplating using a composite plating solution in which carbon particles are added to an Ag plating solution (Ag alloy plating solution) containing Sb, thereby forming a composite plating layer on a base material, the composite plating layer comprising a composite material containing carbon particles and Sb in an Ag layer, with a carbon content of 6.0 mass % or more and a Sb content of 0.5 mass % or more.

The Ag plating solution may be a so-called cyan bath containing cyanide. As used herein, "cyan" is a general term for substances having cyanide ions.

As an example of the Ag plating solution, a plating bath comprising 50 to 150 g/L of sodium silver cyanide, 150 to 450 g/L of sodium cyanide, and 3 to 20 g/L of diantimony trioxide (Sb) may be used. Antimony potassium tartrate, etc., may be used instead of the diantimony trioxide.

Further, the Ag plating solution having a selenium concentration of 5 to 15 mg/L and a mass ratio of silver to free cyan of 0.9 to 1.8, may be used.

When forming the composite plating layer on the base material by electroplating, a composite plating solution in which carbon particles are added to the Ag plating solution, is used. A liquid temperature of the composite plating solution when performing electroplating for forming the composite plating layer on the base material, is preferably 10 to 40° C., more preferably 15 to 30° C.

Further, it is preferable to form the composite plating material under a condition that the percentage occupied by the carbons on the surface of the composite plating layer is 15 to 80% in terms of an area ratio.

A stirring speed for the composite plating solution when forming the composite plating layer is preferably 400 rpm or less, and a current density when forming the composite plating layer by electroplating is preferably $4A/dm^2$ or more.

The stirring speed for the composite plating solution during electroplating can be adjusted as appropriate depending on an apparatus used. However, it is considered that by adopting a low value as the stirring speed, a surface roughness of the composite plating layer is increased and the carbon particles are easily entangled in the composite plating layer. A suitable range of the stirring speed varies depending on an apparatus used, and is generally (preferably less than) 400 rpm or less (particularly in the case of a stirrer (cross stirrer) described in the item of the examples described later).

A current density during electroplating is preferably $4A/dm^2$ or more, more preferably 4 to $10A/dm^2$. It is considered that due to these regulations, the surface roughness of the composite plating layer is increased and the carbon particles are easily entangled in the composite plating layer.

The concentration of the carbon particles in the composite plating solution is preferably 10 to 200 g/L, more preferably 20 to 80 g/L. When it is 10 g/L or more, an amount of the carbon particles to be composited is kept appropriate, and even when an amount exceeding 200 g/L is added, the carbon particles in the composite plating layer hardly increase.

Further, when the ratio of the concentration of Ag, the concentration of Sb, and the concentration of the carbon particles in the composite plating solution is 10:1:5 to 40:1:30, as shown in the item of examples described later, not only the wear resistance but also other characteristics can be improved, which is preferable. That is, in the composite plating solution, when the concentration of Sb is 1, the concentration of Ag is preferably set between 10 and 40 times that concentration. Further, when the concentration of Sb is 1, the concentration of the carbon particles is preferably set between 5 and 30 times that concentration.

It is preferable that the carbon particles are carbon particles that have been subjected to an oxidation treatment. That is, it is preferable to perform an oxidation treatment of the carbon particles, (for removing organic substances from the carbon particles) before adding the carbon particles.

By adding the oxidized carbon particles to the plating solution in this way, a plating solution in which the carbon particles are well dispersed in the plating can be obtained, without using an additive such as a dispersant and without coating the surface of the carbon particles. By performing electroplating using this composite plating solution, a composite plating layer is formed on the base material, the composite plating layer comprising a composite material containing carbon particles and Sb in the Ag layer.

Further, an underplating layer may be formed on the base material before the composite plating layer is formed on the base material. As the underplating layer, it is preferable to form an underplating comprising at least one selected from, for example, Ni plating and Cu plating. The Ni and Cu underplating may be laminated to form a plurality of layers. As a specific method for forming the Ni plating and Cu plating, a known method can be adopted.

Further, as described in [0021] of Patent Document 2, a silver matrix alignment modifier, a brightener, etc., may be added to the composite plating solution, in addition to the carbon particles subjected to oxidation treatment. The silver matrix alignment modifier and brightener preferably contain selenium (Se) ions, and may be added as potassium selenocyanate (KSeCN).

Further, the concentration of Se in the composite plating solution may be 1 to 48 mg/L.

On the other hand, as shown in the item of examples described later, in the case of the present embodiment, it is also one of the technical features of the present invention that good test results for hardness can be obtained without addition of the silver matrix alignment modifier (that is, substantially no selenium in the composite plating layer ($Se \leq 10$ ppm)). Whether or not the silver matrix alignment modifier is added may be determined depending on a type of the plating solution.

The technical scope of the present invention is not limited to the above-described embodiment, and includes various modifications and improvements as long as the specific effects obtained by the constituent requirements of the invention and the combination thereof can be derived.

For example, the fact that a hard film can be obtained by adding an element selected from a group consisting of Sn, In, and Te to the plating solution, is described in the publication "Surface Technology vol.70, No9, 2019", page 428, "Progress of Precious Metal Plating Technique".

Further, for example, as shown in the item of examples described later, in order to improve the adhesion of the composite plating layer, Ag strike plating may be applied to the base material before forming the composite plating layer. For this Ag strike plating, a known method relating to Ag strike plating described in of Patent Document 1 and [0033] of Patent Document 2 may be adopted. In order to distinguish the composite plating described in the present embodiment from Ag strike plating, the composite plating (layer) of the present embodiment is also referred to as a "main plating (layer)".

Further, the underplating layer may be formed prior to the strike plating. The underplating layer is not limited, but for example, underplating comprising at least one selected from Ni plating and Cu plating may be acceptable. The Ni and Cu underplating may be laminated to form a plurality of layers. As a specific method for forming the Ni plating and Cu plating, a known method may be adopted.

Further, a technical idea of the present invention is reflected on the composite plating solution which is a basis of the above-described composite plating layer, and the composite plating solution itself satisfies the present invention. Specific configurations and suitable examples of the composite plating solution are as described above.

EXAMPLES

Next, the present invention will be specifically described, with reference to examples. The present invention is not limited to the following examples. The contents not described below are the same as the contents described in the present embodiment.

Example 1

80 g of scaly graphite particles (natural graphite J-CPB manufactured by Nippon Graphite Industry Co., Ltd.) having a major axis of 5 μm were added as carbon particles to 1.4 L of pure water, and a temperature of this mixed solution was raised to 50° C. while stirring. Next, 0.6 L of an aqueous solution containing 27 g of potassium persulfate as an oxidizer was gradually added dropwise to this mixed solution, followed by stirring for 2 hours for oxidation treatment, then, filtering was performed by filter paper and washing is performed with water. By the above oxidation treatment, carbon particles were prepared, from which adhered hydrophobic substances such as hydrocarbons were removed.

Further, a copper alloy plate having a thickness of 0.2 mm (a copper alloy plate containing 1.0 mass % of Ni, 0.9 mass % of Sn, and 0.05 mass % of P, and a remaining portion of Cu) (NB109 EH manufactured by DOWA Metal Tech Co., Ltd.) was prepared as a base material, and this base material was immersed in an Ag strike plating solution (cyan bath) containing 3 g/L of potassium silver cyanide and 90 g/L of potassium cyanide, and electroplating (Ag strike plating) was performed, with the base material as a cathode and a titanium platinum mesh electrode plate (platinum-plated titanium mesh material) as an anode, with a liquid temperature set at 25° C., a current density set at $5A/dm^2$, and a plating time set at 30 seconds.

Further, 30g/L of carbon particles subjected to the oxidation treatment were added to a cyan-based Ag—Sb alloy plating solution containing 10 mass % of potassium silver cyanide, 30 mass % of sodium cyanide and 50 mL/L of Nissin Bright N (brightener, containing 6 mass % of diantimony trioxide) (manufactured by NISSHIN & CO.,LTD.), to produce a composite plating solution containing Sb and carbon particles in the Ag layer. The Ag concentration and the antimony (Sb) concentration in the composite plating solution were 60 g/L and 2.5 g/L, respectively.

The base material is immersed in the composite plating solution, with the base material with Ag strike plating as a cathode, and an Ag electrode plate as an anode, and electroplating (composite plating (main plating)) was performed, with a liquid temperature set at 18° C., a stirring speed set at 250 rpm, a current density set at $5A/dm^2$, and a plating time set at 250 seconds, and a 3.8 μm-thick composite plating layer was formed on the base material interposing the Ag strike plating layer, followed by performing washing with water for 15 seconds and drying with a dryer, to produce a composite plating material. The composite plating solution (1 L) was put in a beaker having a capacity of 1 L and a diameter of 110 mm to prepare a plating bath, and AS ONE's magnetic stirrer REXIM RS-1DN (cross stirrer having a width of 38.1 mm, height of 15.8 mm) was used for stirring.

For the "thickness of the composite plating layer", it was obtained by measuring a range of 1.0 mm in diameter at the center of a sample, using a fluorescent X-ray film thickness meter (FT9450 manufactured by Hitachi High-Tech Science Corporation).

"mass % of Sb" and "mass % of C" were observed by magnifying 1000 times at an acceleration voltage of 15 kV using a tabletop microscope, which is an electron microscope (TM4000 Plus, manufactured by Hitachi High-Technologies Corporation), and in this observation area, an amount of Sb (mass %) and an amount of C (mass %) measured by EDX analysis using an energy dispersive X-ray analyzer (AztecOne manufactured by Oxford) attached to the tabletop microscope, were defined as a Sb content and a carbon content in the composite plating layer.

"Arithmetic mean surface roughness Ra of the composite plating layer" was measured based on JIS B0601 (2001), by magnifying the surface 1000 times using a laser microscope (VK-X100 manufactured by KEYENCE CORPORATION).

"Surface Vickers hardness HV of the composite plating layer" was measured based on JIS Z2244, by applying a load of 0.1 N for 15 seconds using a micro-hardness meter (HM221 manufactured by Mitutoyo Co., Ltd.), and an average value of three measurements was adopted.

For a "crystallite size of the composite plating layer", the surface of the composite plating layer was subjected to X-ray diffraction (Cu Kα ray tube, tube voltage 30 kV, tube current 10 mA) using Bruker's D2Phaser2nd Generation, and a full width at half maximum (FWHM: Full Width at Half Maximum) was obtained from detected peaks on (111) and (222) planes of Ag using Rigaku's analysis software PDXL, and a crystallite size was calculated from Scherrer's equation. In order to reduce a bias due to the crystal planes, a value obtained by averaging the crystallite sizes of the (111) plane and the (222) plane of Ag was taken as the crystallite size of the composite plating.

The Scherrer equation is as follows.

$$D=K\cdot\lambda/\beta\cdot\cos\theta$$

D: Crystallite size

K: Scherrer constant is 0.9 because a full width at half maximum is used.

λ: X-ray wavelength is 1.54 A because the X-ray is CuKα ray.

β: Full width at half maximum (FWHM) (rad)

θ: Measurement angle (deg)

The "carbon area ratio on the surface of the composite plating layer" was obtained by observing the surface of the composite plating layer. Specifically, a reflected electron composition (COMPO) image magnified 1000 times at an acceleration voltage of 5 kV using the above-described Desktop microscope TM4000 Plus (manufactured by Hitachi High-Technologies Corporation), was binarized using GIMP 2.10.10. (Image analysis software), and an area ratio occupied by carbon was calculated. More specifically, when a highest brightness is 255 and a lowest brightness is 0 in all pixels, a gradation is binarized so that the pixels with a brightness of 127 or less are black and the pixels with a brightness of more than 127 are white, and a ratio Y/X of the number of pixels Y of the carbon particles with respect to the number of pixels X of an entire image was calculated as a carbon area ratio (%) on the surface.

For a "Reflection density on the surface of the composite plating layer", the reflection density was measured visually and using a reflection densitometer RD-918 manufactured by Gretag Macbeth. Appearance colors and measurement values are listed in Table 1. In the case of this test example, the reflection density is good when a gloss is silver. A numerical value is a ratio of the density obtained from an incident light and the density obtained from a reflected light, and is preferably 0.7 or more.

"Wear resistance" was measured by a sliding tester (CRS-G2050-DWA) manufactured by Yamasaki Seiki Laboratory.

As an indent to be slid over a flat plate-shaped composite plating material (evaluation sample) of example 1, an indent with an Ag—Sb plating layer having a thickness of 20 μm which was formed using an Ag—Sb alloy plating solution of comparative example 2 described later, after pressing (so-called applying indentation to) the copper alloy plate with an inner diameter of 1.0 mm, was used as an indenter with a pointed shape. This indent was applied to the above sliding tester, and sliding was continued over the composite plating material of example 1 at a contact load of 2N, a sliding speed of 3 mm/s, and a sliding distance of 10 mm until 1000 round trips or until the base material was exposed.

The thickness of the composite plating layer after the sliding test was measured by the same method as the above "thickness of the composite plating layer" except that a measurement area was within a range of 0.1 mm in diameter at the center of a sliding mark (scraping part). An amount of scraping is a difference in the thickness of the composite plating layer before and after the sliding test, and when the amount of scraping is 1 μm or less, the composite plating layer is considered to have excellent wear resistance.

For obtaining an "average friction coefficient" in the above-described sliding test, force (F) applied in a horizontal direction when moving to half of a sliding distance of an outward path during one reciprocating sliding, was measured, and a friction coefficient was calculated from μ (friction coefficient)=F/N (N is a normal force of 2N), and the friction coefficient was calculated 1000 times or each time until the base material was exposed, to obtain an average value as an average friction coefficient. The average friction coefficient of 0.5 or less was considered good.

For obtaining an "average contact resistance (contact reliability)" in the above-described sliding test, a contact resistance when moving to half of the sliding distance of the outward path during one reciprocating sliding was measured 1000 times or each time until the base material was exposed, to obtain an average of a contact resistance as an average contact resistance. The contact resistance of 3 mΩ or less is considered good in contact reliability.

A scratch resistance was investigated as follows. The composite plating material of example 1 was subjected to a scratch test using Revestest-RST manufactured by CSM Instruments. As an indenter, a nanotech diamond indenter (R=0.2 mm, 120° conical shape) was adopted, and a distance of 10 mm was scratched. Then, the composite plating material after the scratch test was observed with a laser microscope (similar to that used in "arithmetic mean surface roughness Ra of the composite plating layer"), and a line roughness at a place where a set load was applied, that is, at an end of a scratch mark (a width of 1 cm perpendicular to a longitudinal direction of the scratch mark centered on the end of the scratch mark, that is, at the end of the scratch mark in a scratch direction) was measured, to obtain a maximum valley depth Rv. When the thickness of the composite plating layer is larger than the maximum valley depth Rv of the scratch mark (that is, when the composite plating layer remains after the test), the composite plating material was considered to be scratch resistant.

The load was set so as to be increased to a final load after moving for a distance of 10 mm, with an initial load set at 1 (N). Also, the final load was calculated according to a plating thickness, to satisfy final load/plating thickness=1 (N/μm).

The following tables summarize the above various contents.

Table 1 is a table summarizing a difference in a product between the composite plating material in each example and the composite plating material in each comparative example.

Table 2 is a table summarizing a difference in a method for producing a composite plating material between the method in each example and the method in each comparative example.

Table 3 is a table summarizing test results for the composite plating material in each example and the composite plating material in each comparative example.

TABLE 1

| | Example 1 | Example 2 | Example 3 | Com. Ex. 1 | Com. Ex. 2 | Com. Ex. 3 | Com. Ex. 4 | Com. Ex. 5 |
|---|---|---|---|---|---|---|---|---|
| Thickness of (composite) plating layer (μm) | 3.8 | 1.8 | 18.7 | 5.1 | 6.6 | 4.1 | Unmeasurable | 5.6 |
| Sb content (mass %) | 2.0 | 2.2 | 1.5 | 1.8 | 0 | 2.0 | Unmeasurable | 0 |
| C content (mass %) | 10.2 | 11.4 | 26.9 | 0 | 33.5 | 5.8 | Unmeasurable | 11.1 |
| Ag content (mass %) | Remaining portion | Remaining portion | Remaining portion | Remaining portion | Remaining portion | Remaining portion | Unmeasurable | Remaining portion |
| Arithmetic mean surface roughness Ra (μm) | 0.4 | 1.2 | 4.6 | 0.2 | 1.8 | 0.1 | Unmeasurable | 0.2 |
| Vickers hardness HV | 176 | 189 | 188 | 180 | 70 | 179 | Unmeasurable | 92 |
| Crystallite size | 18 nm | 15 nm | 25 nm | 31 nm | 44 nm | 21 nm | Unmeasurable | 75 nm |
| Surface carbon area ratio (%) | 20 | 21 | 45 | 0 | 60 | 10 | Unmeasurable | 61 |
| Appearance (reflection density) | Silver 0.79 | Silver 1.08 | Silver 1.73 | Silver 1.72 | Black 0.51 | Silver 0.85 | Unmeasurable | White 0.25 |

Com. Ex. = Comparative Example

TABLE 2

| | Example 1 | Example 2 | Example 3 | Com. Ex. 1 | Com. Ex. 2 | Com. Ex. 3 | Com. Ex. 4 | Com. Ex. 5 |
|---|---|---|---|---|---|---|---|---|
| Presence or absence of underplating layer | absence | presence | absence | absence | absence | absence | absence | absence |
| Plating bath type | Cyan bath | Cyan bath | Cyan bath | Cyan bath | Sulfonic acid bath | Cyan bath | Cyan bath | Cyan bath |
| Presence or absence of Sb | presence | presence | presence | presence | absence | presence | presence | absence |
| Presence or absence of carbon particles | presence | presence | presence | absence | presence | presence | presence | presence |
| Main plating bath temperature (° C.) | 18 | 18 | 18 | 18 | 25 | 18 | 18 | 18 |
| Stirring speed (rpm) | 250 | 250 | 250 | 500 | 500 | 500 | 500 | 500 |
| Current density (A/dm2) | 5 | 5 | 5 | 3 | 3 | 3 | 5 | 3 |
| Main plating time (second) | 250 | 100 | 1000 | 250 | 250 | 250 | 250 | 250 |

Com. Ex. = Comparative Example

TABLE 3

| | | Example 1 | Example 2 | Example 3 | Com. Ex. 1 | Com. Ex. 2 | Com. Ex. 3 | Com. Ex. 4 | Com. Ex. 5 |
|---|---|---|---|---|---|---|---|---|---|
| Thickness of (composite) plating layer (μm) | | 3.8 | 1.8 | 18.7 | 5.1 | 6.6 | 4.1 | Unmeasurable | 5.6 |
| wear resistance | Yes or No of material exposure | No | No | No | Yes with 370 swings | No | Yes with 836 swings | Unmeasurable | No |
| | Thickness after sliding (μm) | 3.5 | 1.6 | 18.2 | 0 | 4.1 | 0 | Unmeasurable | 4.4 |
| | Amount of scraping (μm) | 0.3 | 0.2 | 0.5 | 5.1 | 2.5 | 4.1 | Unmeasurable | 1.2 |
| Average friction coefficient | | 0.2 | 0.2 | 0.2 | 1.2 | 0.3 | 0.2 | Unmeasurable | 0.3 |
| Average contact resistance (mΩ) | | 1.9 | 1.2 | 2.1 | 1.0 | 1.4 | 1.1 | Unmeasurable | 0.6 |
| Scratch resistance (maximum valley depth Rv of the scratch mark)) | | 1.8 μm at 5N | 1.4 μm at 2N | 16.1 μm at 20N | 0.9 μm at 5N | 7.3 μm at 5N | 2.1 μm at 5N | Unmeasurable | 53 μm at 5N |

Com. Ex. = Comparative Example

Example 2

A composite plating material with a composite plating layer having a thickness of 1.8 μm was produced by the same method as in example 1, except that before forming the Ag strike plating, the base material was immersed as a cathode in a Ni plating bath of a composition comprising 500 mL/L of nickel sulfamate, 25 g/L of nickel chloride hexahydrate and 35 g/L of boric acid, and a Ni electrode plate was used as an anode, to perform Ni underplating with a thickness of 1 μm on the base material, with a liquid temperature set at 18° C., a current density set at 4 A/dm$^2$, a plating time set at 140 seconds and a composite plating time set at 100 seconds. Other conditions and evaluation results are as shown in Tables 1 to 3.

Example 3

A composite plating material with a composite plating layer having a thickness of 18.7 μm was produced by the same method as in example 1 except that the composite plating time was 1000 seconds. Other conditions and evaluation results are as shown in Tables 1 to 3.

Comparative Example 1

A plating material with an Ag—Sb alloy plating layer having a thickness of 5.1 μm, was produced by the same method as in example 1 except that graphite particles were not added to the Ag—Sb plating solution. Other conditions, evaluation results, etc. are as shown in Tables 1 to 3.

Comparative Example 2

The same base material as in example 1 was prepared, and a sulfonic acid bath (Dyne Silver GPE-ST (manufactured by Daiwa Kasei Co., Ltd.)) with an Ag concentration of 3 g/L was prepared as an Ag strike plating solution, and this base material was immersed as a cathode in the Ag strike plating solution, and the Ag electrode plate was used as an anode, to perform Ag strike plating on the base material with a current density set at 5 A/dm$^2$, and a plating time set at 30 seconds.

The Ag strike plating was followed by inclusion of carbon particles at a concentration of 30g/L to the sulfone-based Ag plating solution containing sulfonic acid Ag and sulfonic acid at an Ag concentration of 30 g/L (Dyne Silver GPE-PL (manufactured by Daiwa Kasei Co., Ltd.)), and electroplating was performed using an Ag strike-plated base material as a cathode and an Ag electrode plate as an anode, with a liquid temperature set at 25° C., a stirring speed set at 500 rpm, a current density set at 3 A/dm$^2$ and a plating time set at 250 seconds, to produce a plating material with an Ag plating layer having a thickness of 6.6 μm on the base material interposing the Ag strike plating layer. Other conditions, evaluation results, etc. are as shown in Tables 1 to 3.

Comparative Example 3

A composite plating material with a composite plating layer having a thickness of 4.1 μm, was produced by the same production method as in example 1, except that the stirring speed was 500 rpm and the current density was 3 A/dm$^2$. Other conditions, evaluation results, etc. are as shown in Tables 1 to 3.

Comparative Example 4

Production of a composite plating material with a composite plating layer was tried by the same production method as in example 1, except that the stirring speed was 500 rpm. However, the composite plating layer was precipitated from the base material in granular form and peeled off from the base material, resulting in a failure of evaluation. Other conditions are as shown in Tables 1 to 3.

Comparative Example 5

A plating material with Ag—C plating having a thickness of 5.6 μm was produced by the same production method as in example 1, except that an Ag plating solution (cyan bath) comprising 150 g/L of potassium silver cyanide, 90 g/L of potassium cyanide and 3.6 g/L of potassium cyanide selenate (that is, not containing Sb) was prepared, with an Ag concentration set at 80 g/L, a stirring speed set at 500 rpm, and a current density set at 3 A/dm$^2$. Other conditions, evaluation results, etc. are as shown in Tables 1 to 3.

[Conclusion]

As shown in Table 3, each example showed good results in all test items. According to each example, the composite plating layer and the composite plating material having high wear resistance were obtained.

On the other hand, in comparative examples 1 to 3 and 5, the composite plating layer and the composite plating material had poor wear resistance. In comparative example 4, granular electrodeposits were generated in a plating film, and the plating film was peeled off from a base material, resulting in the failure of the measurement itself.

Further, the gloss of the composite plating layer was good in each example, whereas it was poor in comparative examples 2 and 5. Further, in comparative example 1, the friction coefficient was relatively high. In comparative example 2, the scratch resistance was poor.

The invention claimed is:

1. A composite plating material, comprising:

a base material, and a composite plating layer on the base material, the composite plating layer comprising a composite material containing carbon particles and Sb in an Ag layer, with a carbon content of 6.0 mass % or more and a Sb content of 0.5 mass % or more.

2. The composite plating material according to claim 1, wherein a percentage occupied by the carbon particles on the surface of the composite plating layer is 15 to 80% in terms of an area ratio.

3. The composite plating material according to claim 1, wherein surface Vickers hardness HV of the composite plating material is 150 or more.

4. The composite plating material according to claim 1, wherein arithmetic mean surface roughness Ra of the composite plating layer is 0.3 μm or more.

5. The composite plating material according to claim 1, wherein a crystallite size of the composite plating layer is 40 nm or less.

6. The composite plating material according to claim 1, wherein a carbon content and a Sb content in the composite plating layer are 30 mass % or less and 5 mass % or less, respectively.

7. The composite plating material according to claim 1, wherein the base material is copper or a copper alloy.

8. The composite plating material according to claim 1, wherein an underplating layer is provided between the base material and the composite plating layer.

9. The composite plating material according to claim 8, wherein the underplating layer comprises at least one selected from a Ni plating layer and a Cu plating layer.

10. A method for producing a composite plating material, comprising:

performing electroplating using a composite plating solution in which carbon particles are added to an Ag plating solution containing Sb, thereby forming a composite plating layer on a base material, the composite plating layer comprising a composite material containing carbon particles and Sb in an Ag layer, with a carbon content of 6.0 mass % or more and a Sb content of 0.5 mass % or more.

11. The method for producing a composite plating material according to claim 10, wherein a percentage occupied by the carbon particles on a surface of the composite plating layer is 15 to 80% in terms of an area ratio.

12. The method for producing a composite plating material according to claim 10, wherein a stirring speed for the composite plating solution when forming the composite plating layer is 400 rpm or less.

13. The method for producing a composite plating material according to claim 10, wherein a current density of the electroplating is 4 A/dm$^2$ or more.

14. The method for producing a composite plating material according to claim 10, wherein the carbon particles are carbon particles that have been subjected to an oxidation treatment.

15. The method for producing a composite plating material according to claim 10, wherein an underplating layer is formed on the base material before forming the composite plating layer.

16. The method for producing a composite plating material according to claim 15, wherein the underplating layer comprises at least one selected from a Ni plating layer and a Cu plating layer.

17. The composite plating material according to claim 1, wherein the carbon content in the composite plating layer is 8.0 mass %.

18. The method for producing the composite plating material according to claim 10, wherein the carbon content in the composite plating layer is 8.0 mass %.

* * * * *